Nov. 15, 1932.  L. C. SAVALE  1,887,947
VEHICLE SEAT
Filed April 11, 1929   2 Sheets-Sheet 1

Louis C. Savale
INVENTOR
BY
ATTORNEY.

Nov. 15, 1932.   L. C. SAVALE   1,887,947
VEHICLE SEAT
Filed April 11, 1929   2 Sheets-Sheet 2
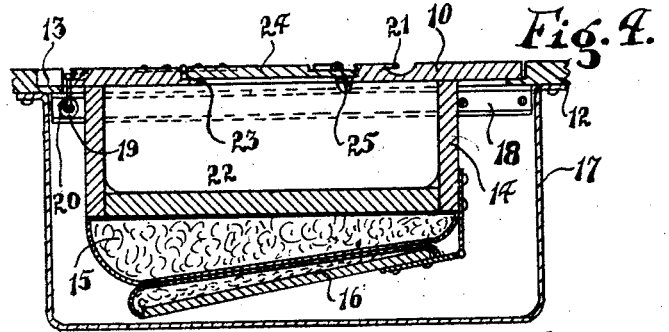
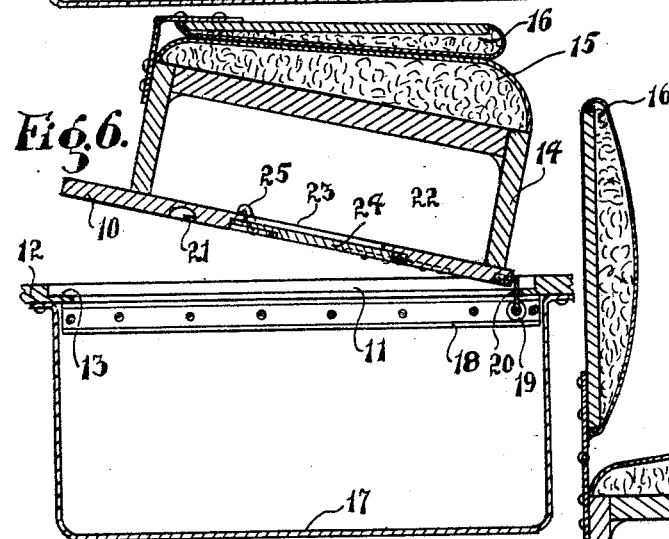
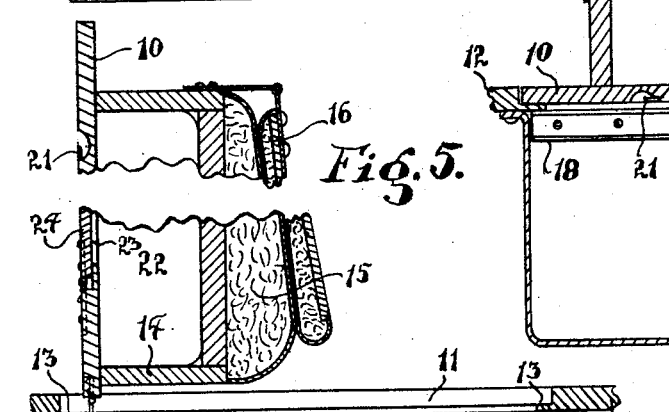
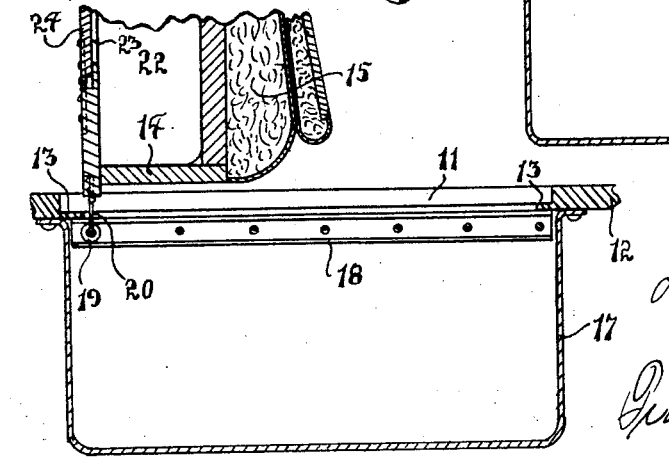
Louis C. Savale
INVENTOR
BY
his ATTORNEY.

Patented Nov. 15, 1932

1,887,947

UNITED STATES PATENT OFFICE

LOUIS C. SAVALE, OF WEST ORANGE, NEW JERSEY, ASSIGNOR OF ONE-HALF TO HOWELL TOPPING, OF ORANGE, NEW JERSEY

VEHICLE SEAT

Application filed April 11, 1929. Serial No. 354,222.

My invention relates to vehicle seats, and more particularly to an invertible seat which, when not in use, may be positioned below the flooring of the vehicle, the base of the seat when so positioned forming a part of such flooring.

It is a common practice to provide vehicle seats of various types which, when not in use, may be collapsed and folded to a position at one side of a passageway in which they may be positioned when it is desired to use the seat. It is also a common practice, in two-door automobile coaches, to hinge one of the front seats, that to the right of the car, so that it may be turned toward the front of the car to permit ingress to or egress from the car.

The purpose of all such seats as are above referred to, has been to provide gangway for people passing to or from the back seat of the vehicle, and such seats are so constructed as to serve merely as a temporary convenience for this purpose.

The vehicle seat of my invention, unlike the type of seat above referred to, is designed to be inverted as to its position so that when not in use it may be removed in its entirety from its position within the vehicle, and form a part of the floor space in the vehicle, which may not only be utilized as a passageway, but will permit the storage of packages of various kinds thereupon. This construction permits a seat to be provided with ordinary cushions and upholstery, the seat proper in fact differing from the ordinary seat merely in the provision of a hinged back in order to restrict the space required to permit the complete inversion of the seat and its positioning below the plane of the flooring, as to all parts thereof excepting the base which forms a part of this flooring.

Furthermore, a seat embodying the invention, when not in position to be used for the accommodation of a passenger, presents no obstructions of any kind within a vehicle, and is not subject to accidental displacement while a person is occupying or passing over same. The seat cushion and back, when the seat is not in use, are protected not only from the elements, but from people passing over the seat, and the portion of the seat constituting a portion of the flooring is so firmly supported, and so closely fitted as to the floor proper, as to avoid possibility of a person tripping over any portion thereof.

In addition to the foregoing advantages, it is possible and preferable to utilize the hollow portion of the seat as a storage place for articles of various kinds, such as tools, small parcels, etc., all of which will be protected by the seat proper and be readily accessible, particularly when the seat is not in use.

The seat of my invention may be so constructed as to permit the rapid and convenient inversion thereof, and the positioning of the base, when in either the open or the closed position, so as to firmly support the seat and avoid displacement thereof as a result of vibrations of the body of the vehicle.

The invention consists primarily in the combination with a floor area having an opening therethrough of an invertible base plate fitted to said opening, and a non-collapsible seat member permanently secured to one side of said base plate; and in such other novel features of construction and combination of parts, as are hereinafter set forth and described, and more particularly pointed out in the claims hereto appended.

Referring to the drawings,

Fig. 4 is a section on the line 4—4 of Fig. 2;

Fig. 5 is a view similar to Fig. 4 showing the first position of the various parts when raising the seat;

Fig. 6 is a similar view showing the second position thereof; and

Fig. 7 is a similar view showing the seat in position.

Like numerals refer to like parts throughout the several views.

Figure 1:
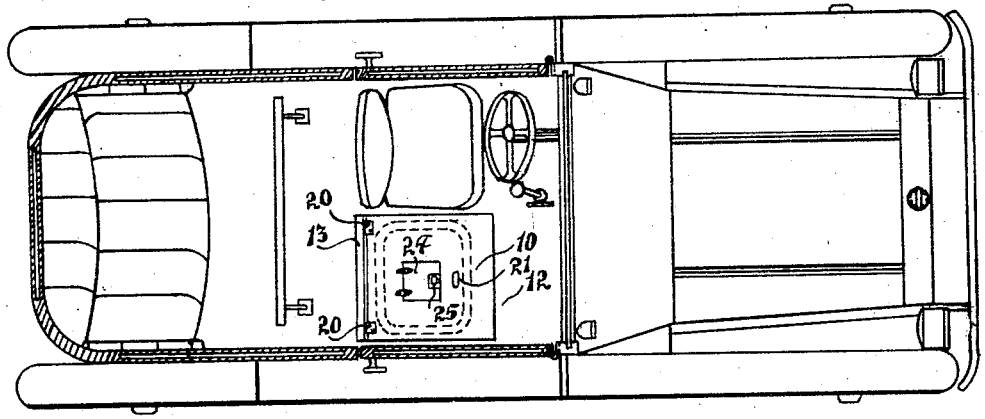
Fig. 1 is a horizontal section through an automobile of the two-door coach type provided with a seat embodying my invention, said seat being in what may be termed the closed position.

In Fig. 1 of the drawings I have illustrated merely one use of the vehicle seat of my invention, it being obvious that the particular construction of seat is capable of a wide variety of uses, such as in aircraft, boats, auditoriums, etc., wherein the floor area, under normal conditions, is required to be unobstructed and where it may be required, under other conditions, to increase the seating capacity.

While the details of construction may vary to meet the particular needs of the use to which the seat is to be put, irrespective of the conditions of use, the structural characteristics will be the same.

Referring more particularly to the embodiment of the invention shown in the drawings, the vehicle seat of my invention includes a base plate 10 which is fitted to an opening 11, formed in the flooring 12 of the vehicle. Preferably the flooring about the edges of the opening is rabbeted as shown at 13 so as to receive and support the plate 10 when it is so positioned as to either bring the structure of the seat proper above or below the flooring 12.

Permanently secured upon one face of the plate 10 is a non-collapsible seat structure 14, provided with a cushioned and upholstered portion 15. The manner of connecting the seat proper 14 with the plate 10 is immaterial and will vary with the manufacturing details, which form no part of the present invention. Said seat portion may be provided with a hinged back 16 of the usual or any desired construction, it being essential when a back is used that it be foldable upon the seat proper.

When used with an automobile, it is desirable to provide a protecting housing 17 below the flooring 12 in which the seat proper 14 may be encased when it is not in use, this housing serving to protect the seat from oil, dust and dirt beneath the car flooring. Upon opposite sides of the housing 17 are channelled tracks 18 for rollers 19, carried by fittings 20 adjacent opposite edges of said seat 14, said fittings 20 being hinged to the base 10 so as to form a support for one end of said plate, while the seat is being inverted to bring it into either the open or the closed position. These hinged fittings permit the complete inversion of the position of the plate 10, and through their sliding movement along the tracks 18 allow the rapid and convenient movement of the base plate 10 as a result of the simultaneous turning movement of this plate about the fittings 20 and the sliding movement of said fittings following the initial raising of the plate 10, as shown in Fig. 5. These fittings and said rollers afford a support for the plate during the turning movement.

The plate 10 is provided with a hand hold 21 to facilitate the turning of the plate, when the seat is in the closed position and the upper face thereof substantially flush with the upper area of the flooring 12.

By using a hollow box seat 14, a chamber or storage space 22 may be provided between the cushioned portion 15 of the seat and the plate 10 which may be utilized as a storage space for small articles by providing said plate 10 with a rabbeted opening 23 therethrough and closing this opening by a hinged cover 24 having a latch member 25 for holding the cover 24 in the closed position. This cover 24 opens away from the seat 14 so as to permit quick and convenient access to the storage space 22, when the seat is in the closed position, the latch member 25 serving to prevent the accidental opening of the cover 24 when the seat is in the open position, as shown in Fig. 7.

By the construction herein described, it will be noted that the seat may be raised and lowered within a space substantially equalling the area of the base plate 10.

The invertibility of the base plate 10, and the permanent securing of a non-collapsible seat to one face thereof, are absolutely essential to the invention and present certain practical advantages which will be hereinafter referred to.

Assuming the parts to be in the position shown in Figs. 1 to 4, it will be noted that the upper face of the plate 10 is substantially flush with the surrounding flooring 12, and that the plate is firmly supported by the rabbets 13 about this opening, the rollers 19 and the fittings 20 affording no additional support to the plate, whether the seat is in either the open or the closed position, since the weight of the parts is entirely taken up by the engagement of the plate with the rabbeted portion of the opening, at least upon three sides thereof. Very little clearance is required to permit the free movement of the plate 10, and the various fittings, if desired, may be countersunk to an extent to present substantially no obstructions upon the upwardly presented face of the plate 10, when the seat is closed.

Figure 2:
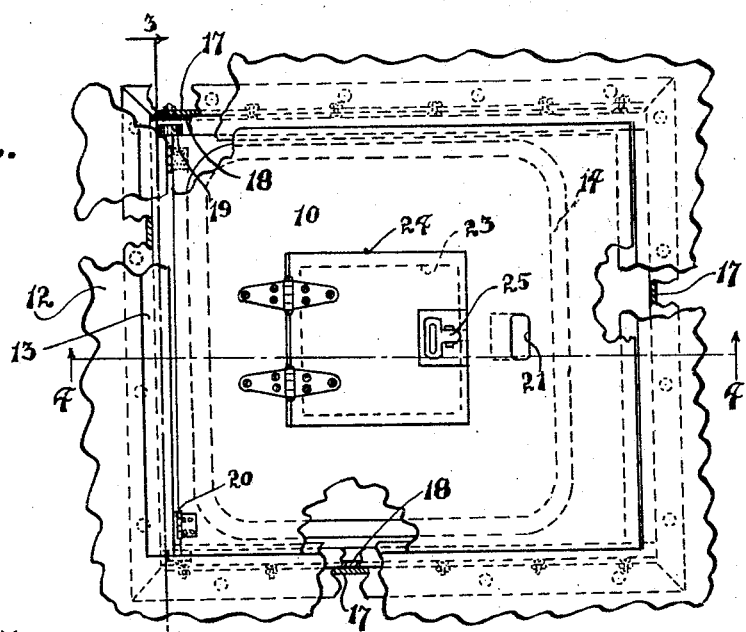
Fig. 2 is an enlarged plan view of a portion of floor area partly broken away showing the seat in the closed position.
Figure 3:
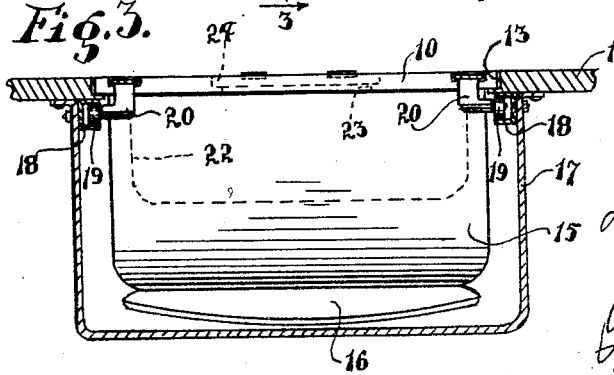
Fig. 3 is a section on the line 3—3 of Fig. 2.

It will be noted particularly, by reference to Fig. 2, that access may be had to the chamber 22 when the seat is closed by merely opening the cover 24. This is particularly desirable if this space be used for a tool chest, since access may be had to tools without removing the seat, which is generally required with various types of automobiles.

Referring again to the conditions illustrated in Figs. 1 to 4, it will be noted that not only may anyone enter the vehicle through the right door thereof without any difficulty, but that various packages may be passed through this door or carried, without any inconvenience whatever, and that if desired, sample cases, bags, etc., may be stored alongside of the driver. Furthermore, small parcels may be safely stored within the compartment 22.

When it is desired to use the seat 14, it is merely necessary, with the aid of the hand hold 21, to raise the plate 10 to its upright position, as shown in Fig. 5, and to then thrust the lower edge of the plate to the right, the rollers 19 not only permitting a free sliding movement of this end of the plate, but supporting the plate and the load of the seat carried thereby, throughout this movement.

With the movement of the rollers 19, the plate 10 and seat 14 will descend, as indicated in Fig. 6, thus ensuring ease in the completion of the opening movement of the seat, it being merely necessary to check the downward movement of these parts until the plate 10 comes to rest upon the rabbet 13, as shown in Fig. 7. When so positioned, the seat 14 will be upon a firm base, and the weight of a person thereon will serve to give the seat in its entirety, including the plate 10, the desired degree of stability. If from jars or jolts the plate 10 should rise slightly, it will merely drop back to its former position.

The construction is such that under no circumstances can the seat collapse, and there are no pivoted connections or parts which, as a result of wear, will make the seat at all unsteady or liable to collapse. While a seat is in use, the only parts which are subject to wear, to wit: the hinged fittings 20 and rollers 19, are relieved from all strains.

When the floor space occupied by the seat is desired for a passageway or for storage area, the back 16, when such is used, is merely folded upon the seat cushion 15, and the portion of the plate 10 adjacent the back of the seat, raised until clear of the rabbeted opening 11 as shown in Fig. 6, whereupon the plate 10 may be moved to the left until the parts are in position, as shown in Fig. 5, after which the plate 10 may be lowered until the parts assume the position shown in Figs. 1 to 4, with the seat in its entirety enclosed in the housing 17 and the plate 10 in its inverted position, as compared with the showing of Fig. 7, on the level of the flooring 12.

It is to be noted that when the parts are in the position shown in Figs. 1 and 4, the conditions are the same as though no seat 14 were present in the vehicle.

It is not my intention to limit the invention to the details of construction shown in the accompanying drawings, it being apparent that such may be varied without departing from the spirit and scope of the invention.

I believe it to be broadly new to provide a disappearing seat which, when in the closed position, is removed in its entirety from above the plane of the flooring, and which includes therein a base plate carrying the seat proper and capable of being reversed to either open or close the seat, which base plate, irrespective of the position of the seat, will form a part of the flooring.

Having described the invention, what I claim as new and desire to have protected by Letters Patent, is:—

1. The combination with a floor area having an opening therethrough and a space below said opening adapted to receive a seat structure of tracks adjacent opposite sides of said opening, a base plate fitted to said opening, members hinged to said base plate, means carried by said hinged members slidably mounted in said tracks, whereby said base plate may be inverted, and a non-collapsible seat member permanently secured to one side of said base plate.

2. The combination with a floor area having an opening therethrough having rabbets about the edge thereof and a space below said opening adapted to receive a seat structure of tracks adjacent opposite sides of said opening, a base plate fitted to said opening and adapted to seat upon said rabbets, members hinged to said base plate, means carried by said hinged members slidably mounted in said tracks, whereby said base plate may be inverted, and a non-collapsible seat member permanently secured to one side of said base plate.

3. The combination with a floor area having an opening therethrough having rabbets about the edge thereof and a space below said opening adapted to receive a seat structure of tracks adjacent opposite sides of said opening, a base plate fitted to said opening and adapted to seat upon said rabbets, members hinged to said base plate, means carried by said hinged members slidably mounted in said tracks, whereby said base plate may be inverted, a non-collapsible seat member permanently secured to one side of said base plate, and a back foldable against said seat.

4. The combination with a floor area having an opening therethrough and a space below said opening adapted to receive a seat structure of an invertible base plate fitted to said opening, a non-collapsible seat member permanently secured to one side of said base plate, and having a chamber formed therein, said base plate having an opening therethrough communicating with said chamber, closure means for said opening, and means whereby said closure means may be positioned in relation to said plate.

5. The combination with a floor area having an opening therethrough having rabbets about the edge thereof and a space below said opening adapted to receive a seat structure of tracks adjacent opposite sides of said opening, a base plate fitted to said opening and adapted to seat upon said rabbets, members hinged to said base plate, means carried by said hinged members slidably mounted in said tracks, whereby said base plate may be inverted, a non-collapsible seat member permanently secured to one side of said base plate and having a chamber formed therein, said base plate having an opening therethrough communicating with said chamber, closure means for said opening, and means whereby said closure means may be positioned in relation to said plate.

6. The combination with a floor area having an opening therethrough having rabbets about the edge thereof and a space below said opening adapted to receive a seat structure of an invertible base plate fitted to said opening and adapted to seat upon said rabbets, a non-collapsible seat member permanently secured to one side of said base plate, and a casing secured beneath said flooring below said opening whereby, upon the inversion of said base plate, said seat member will be completely enclosed by said casing.

In witness whereof I have hereunto affixed my signature, this 18th day of March, 1929.

LOUIS C. SAVALE.